(12) United States Patent
Kastner

(10) Patent No.: US 11,285,406 B2
(45) Date of Patent: Mar. 29, 2022

(54) DEVICE AND METHOD FOR DEGASSING AND FILTERING POLYMER MELTS

(71) Applicant: Next Generation Analytics GmbH, Grieskirchen (AT)

(72) Inventor: Friedrich Kastner, Grieskirchen (AT)

(73) Assignee: Next Generation Analytics GmbH, Grieskirchen (AT)

( * ) Notice: Subject to any disclaimer, the term of this patent is extended or adjusted under 35 U.S.C. 154(b) by 182 days.

(21) Appl. No.: 16/646,812

(22) PCT Filed: Aug. 27, 2018

(86) PCT No.: PCT/EP2018/000450
§ 371 (c)(1),
(2) Date: Mar. 12, 2020

(87) PCT Pub. No.: WO2019/052688
PCT Pub. Date: Mar. 21, 2019

(65) Prior Publication Data
US 2020/0276519 A1    Sep. 3, 2020

(30) Foreign Application Priority Data

Sep. 12, 2017 (EP) ..................................... 17001523

(51) Int. Cl.
*B01D 19/00* (2006.01)
(52) U.S. Cl.
CPC ................. *B01D 19/0036* (2013.01)
(58) Field of Classification Search
CPC ........ B01D 29/01; B01D 29/50; B01D 29/96; B29B 17/0026; B29B 2017/048;
(Continued)

(56) References Cited

U.S. PATENT DOCUMENTS

| 4,615,664 | A | * | 10/1986 | Kolossow | ........... B29C 44/3442 425/4 C |
| 5,518,672 | A | | 5/1996 | Luker | |
| 6,533,934 | B1 | | 3/2003 | Trendelkamp et al. | |

FOREIGN PATENT DOCUMENTS

| DE | 1 131 875 B | 6/1962 |
| DE | 33 36 179 A1 | 4/1985 |

(Continued)

OTHER PUBLICATIONS

International Search Report in PCT/EP2018/000450, dated Nov. 12, 2018.

*Primary Examiner* — Sharon Pregler
(74) *Attorney, Agent, or Firm* — Collard & Roe, P.C.

(57) ABSTRACT

An apparatus for filtering and degassing a plastic melt, in particular of a thermoplastic plastic melt, comprising a feeding extruder (11) which comprises at least one extrusion worm (13) which is rotatable in a housing, wherein the feeding extruder opens into the feeding region of one or several parallel melt filter modules (31) and a discharge extruder (21) with at least one extrusion worm (23) is situated in the discharge region of the melt filter(s), said discharge extruder being operated in the opposite direction of the feeding extruder in such a way that the worm tip (24) acts as the intake zone and the region near the drive acts as the discharge zone, wherein, for discharging the melt, a discharge aperture (27) in the housing is provided before the drive (22) of the discharge extruder, wherein the shaft of the extrusion worm of the discharge extruder is sealed against the drive of the discharge extruder with a sealing element (26) and wherein the feeding extruder opens into melt valves (25) and/or melt deflectors which are upstream of the melt filter, and, in the discharge region of the melt filter(s) and downstream of the melt filter, melt valves (25) and/or melt (Continued)

deflectors are provided, subsequent to which the discharge extruder is situated and the worm tips are mounted.

11 Claims, 1 Drawing Sheet

(58) Field of Classification Search
CPC ......... B29B 7/58; B29B 7/7466; B29B 7/845; B29B 7/86
See application file for complete search history.

(56) References Cited

FOREIGN PATENT DOCUMENTS

| | | |
|---|---|---|
| DE | 91 05 000 U1 | 8/1991 |
| DE | 10 2011 014 467 A1 | 9/2012 |
| DE | 10 2011 106 244 A1 | 10/2012 |
| EP | 0 270 501 A2 | 6/1988 |
| EP | 0 490 056 A1 | 6/1992 |
| EP | 1 211 048 A2 | 6/2002 |
| EP | 2 082 862 A1 | 7/2009 |
| GB | 1 168 063 A | 10/1969 |
| GB | 2 027 605 A | 2/1980 |
| WO | 9304841 A1 | 3/1993 |
| WO | 9429097 A1 | 12/1994 |
| WO | 2007124519 A1 | 11/2007 |
| WO | 2013013916 A1 | 1/2013 |

\* cited by examiner

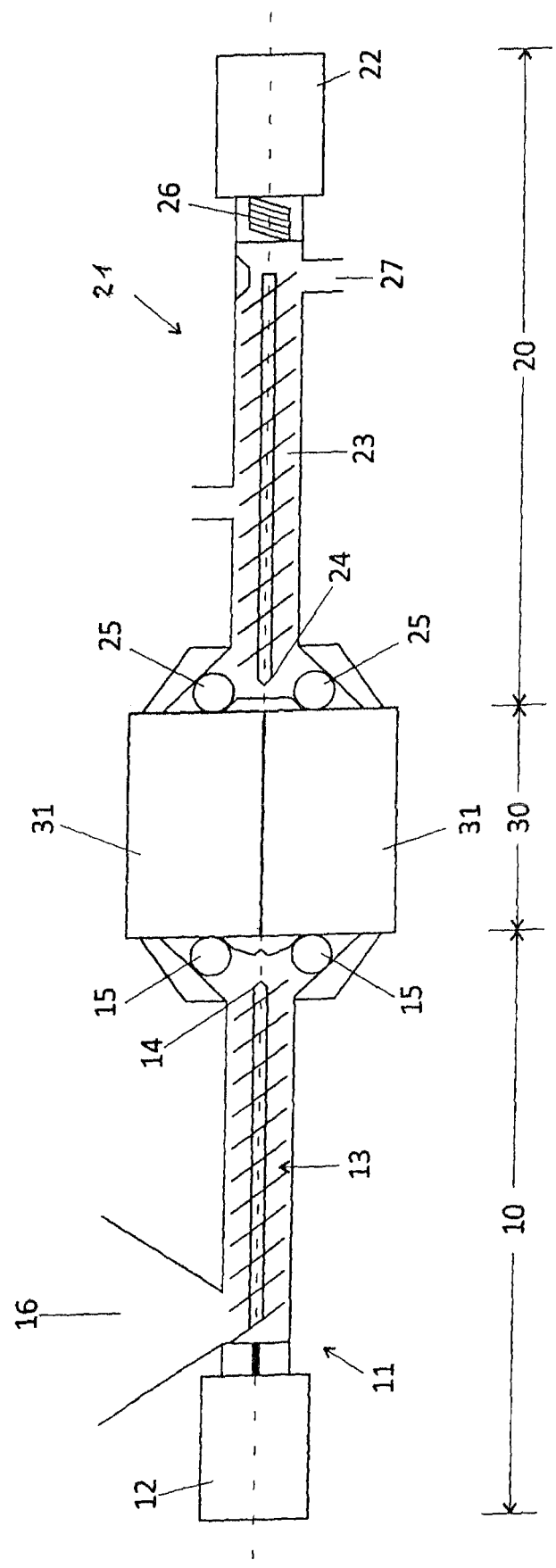

DEVICE AND METHOD FOR DEGASSING AND FILTERING POLYMER MELTS

CROSS REFERENCE TO RELATED APPLICATIONS

This application is the National Stage of PCT/EP2018/000450 filed on Aug. 27, 2018, which claims priority under 35 U.S.C. § 119 of European Application No. 17001523.4 filed on Sep. 12, 2017, the disclosures of which are incorporated by reference. The international application under PCT article 21(2) was not published in English.

The invention relates to an apparatus and method for degassing and filtering in particular of thermoplastic plastic melts.

Plastics from production waste or plastic material that has already been in circulation contain impurities, which are caused, for example, by printing, varnishing or contamination; but metals, other plastics and organic impurities are present in plastic waste as well.

The impurities also often consist of substances that have a low molecular weight or that are volatile. The impurities of low molecular weight often have a high vapor pressure, and when the plastics are heated, they may be foamed, as with a blowing agent.

Therefore, these plastic materials have to be purified before they are recycled.

Above a certain melting temperature, the vapor pressure of the ingredients can become so high that due to the vapor pressure of the impurity, gas bubbles are formed in the carrier material, and the quality of the material is thus severely affected.

Unfortunately, these ingredients can often only be removed when the carrier material is in the molten state; and the gaseous or gas-emitting ingredients can only be removed in this state. Traditional drying methods are mostly very time-consuming as a diffusion process through the material must be carried out here, and the emission reservoirs cannot be removed either.

From WO 93/04841 A, it is known to melt the plastic to be processed in an extruder, guide it through a filter and finally degas it in order to remove volatile impurities. In order to prevent molten plastic from passing from the plasticizing section to the degassing or discharge section and thus ensure that the entire plastic that has been molten passes through the melt filter, a reverse conveyor passage having a pitch opposite to the worm thread of the plasticizing section, the degassing section and the discharge section is provided between the plasticizing section and the discharge section. This way, a part of the melt stream that has already passed through the melt filter is guided back into the plasticizing section. This way, unpurified plastic material is supposed to be prevented from directly entering the degassing or discharge section by bypassing the melt filter.

The disadvantage of this method is that in practice, the melt stream impinges on the seal with at least residual impurities. Especially if metallic or mineral impurities are present, this stream of abrasive material causes wear of the sealing surface; and sooner or later, the melt barrier disappears, and material passes over the sealing surface into the subsequent worm zone. Consequently, this results in a kind of bypass, and contaminated, unfiltered material can pass through the extruder.

Therefore, it was suggested in WO 94/29097 A to provide at least one baffle barrier for the stream of plastic in the housing of the second worm-conveyor zone between the inlet aperture and the degassing apertures which forces the stream of plastic into a tubular shape and is adjustable relative to the inlet aperture, wherein the baffle barrier is located in front of the inlet aperture in such a way that the plastic flowing out of the inlet aperture into the housing of the second worm-conveyor zone directly impinges on the circumference of the baffle barrier, which is arranged in axial distance before the degassing aperture which is closest to it and has a cross-section which tapers towards the second worm-conveyor zone. The disadvantage of this apparatus is that the baffle barrier is subject to mechanical wear due to the plastic melt, and the baffle barrier thus loses its sealing capacity after being in use for a longer period of time, and unfiltered melt can pass through the extruder.

From WO 2007/124519 A, an extruder for degassing and filtering plastic melts is known, having an extrusion worm which is mounted in a housing and comprises a plasticizing section on the inlet side, a degassing section upstream of the discharge section, and a reverse conveyor passage between the plasticizing section and the degassing section, and having at least one flow channel bridging the reverse conveyor passage and containing a melt filter, wherein the extrusion worm forms an equidirectional conveyor passage between the reverse conveyor passage and the mouth of the flow channel on the outlet side and wherein the housing comprises at least one degassing aperture in the transition zone between the reverse and the equidirectional conveyor passages.

This way, material and gas is supposed to be prevented from directly passing from the plasticizing section into the degassing section through the conveyor passage.

From WO 2013/013916 A, an apparatus for degassing thermoplastic extrudate is known, consisting of an extruder housing and an extrusion worm mounted in said housing, said extrusion worm comprising at least one sealing section. Said sealing section axially divides the extruder housing into an upstream and a downstream chamber, with an overflow channel opening from the upstream chamber into the downstream chamber. In the downstream chamber, at least one gas extraction aperture is arranged, which is arranged in the conveying direction of the extrusion worm in the downstream chamber before the mouth of the overflow channel. This way, the degree of degassing of the plastic melt during the entire operation, and also when the apparatus resumes operation, is supposed to be improved. Here, there is also the disadvantage that the sealing section is subject to severe mechanical wear; therefore, it cannot be excluded that the contaminated melt directly passes through as the operating time progresses.

It was the object of the invention to provide an apparatus and a method for degassing and filtering plastic melt which overcomes the disadvantages of the prior art.

Therefore, the object of the invention is an apparatus for filtering and degassing plastic melts, in particular of thermoplastic plastic melts, comprising a feeding extruder which comprises at least one extrusion worm which is rotatable in a housing, wherein the feeding extruder opens into the feeding region of one or several parallel melt filters and a discharge extruder with at least one extrusion worm is situated in the discharge region of the melt filter(s), said discharge extruder being operated in the opposite direction of the feeding extruder in such a way that the worm tip acts as the intake zone and the region near the drive acts as the discharge zone, wherein, for discharging the melt, a discharge aperture in the housing is provided before the drive of the discharge extruder, wherein the shaft of the extrusion worm is sealed against the drive of the discharge extruder with sealing elements and wherein the feeding extruder opens into melt valves and/or melt deflectors which are upstream of the melt filter, and, in the discharge region of the melt filter(s) and downstream of the melt filter, melt valves and/or melt deflectors are provided, subsequent to which the discharge extruder is situated and the worm tips are mounted.

By means of the apparatus and method according to the invention, it is possible, directly after melting, to filter gases and gas-emitting substances out of a melt, which may be produced beforehand, and to further plasticize and homogenize the material with good quality.

If necessary, the purifying process may be supported by additives, auxiliary materials, absorbers, catalysts and the like, wherein the additives may be also be removed or may outgas during filtration.

Feeding and/or discharge extruders may be configured as single-shaft, twin-shaft or multiple-shaft extruders.

The feeding extruder expediently opens into the melt valves and/or melt deflectors upstream of the melt filter(s). In the discharge region of the melt filter(s), melt valves and/or melt deflectors are provided downstream of the melt filter/the melt deflector; behind said melt valves and/or melt deflectors, the discharge extruder is situated.

For example, conventional band filters may be used as melt filters. However, any other filtration system is conceivable as well. In particular, in this region, degassing systems may also be built in which, apart from moisture, also odorous substances, for example by applying a vacuum (e.g. IO-KHmbar).

In the region of the discharge extruder, at least one discharge aperture is provided in the housing; said discharge aperture is arranged in an angle of up to 120°.

The discharge extruder is operated in reverse to the usual direction. In this regard, the worm tip of the discharge extruder projects into the outlet element of the filter and conveys the melt away in the direction of the motor. Thus, the discharge extruder is configured in a mirror-inverted manner with respect to the feeding extruder.

The discharge extruder comprises an intake zone, which is located in the worm tip region. Said intake zone is followed by the compression zone and then by the discharge zone before the region of the drive of the discharge extruder. In the region of the drive of the discharge extruder, the worm is sealed with sealing means. The sealing may be carried out by means of melt solidification, a labyrinth or counter-rotating elements, for example. However, it is also possible to accomplish sealing by supplying sealants or plastic granulate, if necessary via an additional extruder.

Even if leakages occur in this region, they are not relevant for the quality of the filtered melt as the melt is already filtered and therefore cannot contribute to the wear of the components of the extruder.

In this regard, the melt is not discharged via the worm tip as usual but vertically or in an angle of up to 120°. For discharging the melt, a worm which conveys the melt out of the extruder through the discharge aperture may in turn be provided in the discharge region.

In the region of the discharge extruder, one or several degassing zones may be provided. Preferably, degassing may be carried out under negative pressure in said degassing zones.

However, it is also possible to support degassing by means of wires, meanders, pins or shear gaps.

The worm tips of the feeding and/or the discharge extruder are mounted and do not have free ends. This is advantageous in particular if unsymmetrical loading occurs when one of the two filters is blocked off, for example during cleaning of the filter. The mounting of the worm facilitates better synchronization, especially in the case of longer worms, and can absorb additional axial forces.

In FIG. 1, an apparatus according to the invention for filtering and degassing plastic melts is shown.

In this embodiment, 2 filter units are used.

There, 10 designates the feed zone
20 designates the discharge zone
30 designates the filter zone
11 designates the feeding extruder
12 designates the drive of the feeding extruder
13 designates the worm of the feeding extruder
14 designates the worm tip of the feeding extruder
15 designates the melt valves for feeding the melt into the filter region
16 designates the supply aperture for supplying the melt to the feeding extruder
21 designates the discharge extruder
22 designates the drive of the discharge extruder
23 designates the worm of the discharge extruder
24 designates the worm tip of the discharge extruder
25 designates the melt valves for discharging the melt
26 designates a sealing element
27 designates the discharge aperture for transporting the melt out of the discharge extruder
31 designates filter modules

The invention claimed is:

1. An apparatus for filtering and degassing plastic melts comprising a feeding extender which comprises at least one extrusion worm which is rotatable in a housing, wherein the feeding extruder opens into the feeding region of one or several parallel melt filters and a discharge extruder with at least one extrusion worm is situated in the discharge region of the melt filter(s), the discharge extruder being operated in the opposite direction of the feeding extruder in such a way that the worm tip acts as the intake zone and the region near the drive acts as the discharge zone, wherein, for discharging the melt, a discharge aperture in the housing is provided before the drive of the discharge extruder, wherein the shaft of the extrusion worm is sealed against the drive of the discharge extruder with sealing elements and wherein the feeding extruder opens into melt valves and/or melt deflectors which are upstream of the melt filter, and, in the discharge region of the melt filter(s) and downstream of the melt filter, melt valves and/or melt deflectors are provided, subsequent to which the discharge extruder is situated and the worm tips are mounted.

2. The apparatus according to claim 1, wherein in the region of the discharge extruder, the discharge aperture is arranged in an angle of up to 120°.

3. The apparatus according to claim 1, wherein the discharge extruder comprises at least one intake zone, at least one compression zone and at least one discharge zone.

4. The apparatus according to claim 1, wherein one or several degassing zones are provided in the region of the discharge extruder.

5. The apparatus according to claim 1, wherein degassing in the degassing zone is carried out under negative pressure.

6. The apparatus according to claim 1, wherein the feeding extruder comprises at least one at least one intake zone, at least one compression zone and at least one discharge zone.

7. The apparatus according to claim 1, wherein the discharge extruder is configured in a mirror-inverted manner with respect to the feeding extruder.

8. The apparatus according to claim 1, wherein melt solidification means or counter-rotating elements are used as sealing elements which seal the area of the discharge extruder worm against the drive of the exit extruder, or in that sealing is accomplished by supplying sealants or plastic granulate.

9. The apparatus according to claim 1, wherein the worm geometry in the discharge extruder is configured in a mirror-inverted manner with respect to the worm geometry of the feeding extruder.

10. The apparatus according to claim 1, wherein the discharge extruder and/or the feeding extruder comprise(s) one or several extrusion worms, which are configured in an equidirectional or reverse manner.

11. A method for filtering and degassing plastic melts carried out in an apparatus according to claim 1.

* * * * *